(12) United States Patent
Dijs

(10) Patent No.: US 7,383,763 B2
(45) Date of Patent: *Jun. 10, 2008

(54) ASSEMBLY FOR USE IN A COFFEE MACHINE FOR PREPARING COFFEE

(75) Inventor: Daniel Albertus Jozef Dijs, Utrecht (NL)

(73) Assignees: Sara Lee/DE N.V. (NL); Koninklijke Philips Electronics N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/052,657

(22) Filed: Feb. 7, 2005

(65) Prior Publication Data

US 2005/0153027 A1    Jul. 14, 2005

Related U.S. Application Data

(60) Division of application No. 09/955,798, filed on Sep. 19, 2001, now abandoned, which is a continuation of application No. 09/479,630, filed on Jan. 7, 2000, now abandoned, which is a continuation of application No. 09/164,141, filed on Sep. 30, 1998, now Pat. No. 6,021,705.

(30) Foreign Application Priority Data

Sep. 30, 1997    (NL)    .................................. 1007171

(51) Int. Cl.
*A47J 31/00*    (2006.01)

(52) U.S. Cl. .............................. 99/295; 99/323; 99/306
(58) Field of Classification Search .................. 99/295, 99/323, 306, 279, 307, 302 R
See application file for complete search history.

(56) References Cited

U.S. PATENT DOCUMENTS

| 1,690,763 | A |   | 11/1928 | Wertheimer |
| 2,042,039 | A |   | 5/1936  | Cooper |
| 2,715,868 | A | * | 8/1955  | Brown ......................... 426/77 |
| 3,030,874 | A | * | 4/1962  | Fiori ............................ 99/295 |

(Continued)

FOREIGN PATENT DOCUMENTS

BE    620881    11/1962

(Continued)

OTHER PUBLICATIONS

Exhibit H, Photographs of the 28-pad packaging of Merkur Espressor coffee pads attached to the letter of Exhibit G.

(Continued)

*Primary Examiner*—Reginald L. Alexander
(74) *Attorney, Agent, or Firm*—Altera Law Group, LLC

(57) ABSTRACT

The assembly for use in a coffee machine comprises a container having a bowl-shaped inner space bounded by a bottom having at least one outlet opening and at least one vertical sidewall. The assembly further comprises a pill-shaped pouch manufactured from filtering paper and filled with ground coffee, accommodated in the inner space of the container.

The pouch extends over the bottom to a position adjacent the vertical sidewall. In the bottom, a number of channel-shaped grooves are provided, extending in radial direction of the container to the outlet opening. The grooves extend from a position located at a distance from the sidewall in the direction of the outlet opening. This prevents bypass.

25 Claims, 3 Drawing Sheets

U.S. PATENT DOCUMENTS

| | | | | |
|---|---|---|---|---|
| 3,143,954 A | * | 8/1964 | Nesmith | 99/295 |
| 3,208,854 A | * | 9/1965 | Hediger et al. | 426/77 |
| 3,209,676 A | * | 10/1965 | Zimmerman et al. | 99/295 |
| 3,353,474 A | * | 11/1967 | MacCorkell | 99/295 |
| 3,373,677 A | * | 3/1968 | Petrozzo | 426/77 |
| 3,374,897 A | | 3/1968 | Martin | |
| 3,387,553 A | | 6/1968 | Tavera | |
| 3,420,675 A | * | 1/1969 | Costas | 426/77 |
| 3,445,237 A | * | 5/1969 | Gidge | 426/77 |
| 3,450,024 A | * | 6/1969 | Martin | |
| 3,511,166 A | | 5/1970 | Bixby, Jr. | |
| 3,561,349 A | * | 2/1971 | Endo | 99/295 |
| 3,593,650 A | | 7/1971 | Martin | |
| 3,610,132 A | | 10/1971 | Martin et al. | |
| 3,620,155 A | * | 11/1971 | Bixby | |
| 3,846,569 A | * | 11/1974 | Kaplan | 426/77 |
| 4,123,228 A | | 10/1978 | Frei et al. | |
| 4,167,899 A | * | 9/1979 | McCormick | 426/77 |
| 4,253,385 A | * | 3/1981 | Illy | 99/295 |
| 4,254,694 A | * | 3/1981 | Illy | 99/295 |
| 4,382,402 A | * | 5/1983 | Alvarez | 99/295 |
| 4,429,623 A | * | 2/1984 | Illy | 99/295 |
| 4,739,697 A | | 4/1988 | Roberts | |
| 4,872,403 A | * | 10/1989 | LaGesse et al. | 99/295 |
| 4,875,408 A | | 10/1989 | McGee | |
| 5,134,924 A | * | 8/1992 | Vicker | 99/295 |
| 5,287,797 A | | 2/1994 | Grykiewicz et al. | |
| 5,347,916 A | | 9/1994 | Fond et al. | |
| 5,531,152 A | * | 7/1996 | Gardosi | 99/295 |
| 5,638,741 A | * | 6/1997 | Cisaria | 99/295 |
| 5,649,472 A | * | 7/1997 | Fond et al. | |
| 5,755,149 A | * | 5/1998 | Blanc et al. | 99/295 |
| 5,776,527 A | | 7/1998 | Blanc | |
| 5,855,161 A | * | 1/1999 | Cortese | 99/295 |
| 5,870,943 A | * | 2/1999 | Levi | 99/295 |
| 6,009,792 A | * | 1/2000 | Kraan | 99/295 |
| 6,021,705 A | | 2/2000 | Dijs | |
| 6,025,000 A | | 2/2000 | Fond et al. | |

FOREIGN PATENT DOCUMENTS

| | | | | |
|---|---|---|---|---|
| BE | 780319 | | 3/1972 | |
| CA | 2181246 | | 9/1995 | |
| CH | 495138 | * | 10/1970 | 426/77 |
| DE | 1 998 598 | | 12/1968 | |
| DE | 6600728 | | 2/1969 | |
| DE | 1 961 691 | | 6/1971 | |
| DE | 2 253 157 | | 5/1974 | |
| DE | 7430109 | | 3/1976 | |
| DE | 3504441 | * | 2/1985 | |
| DE | 9403616 | * | 2/1994 | |
| DE | 94 03 616 U 1 | | 6/1995 | |
| EP | 0 190 912 | | 8/1986 | |
| EP | 0 249 700 | | 12/1987 | |
| EP | 422898 | * | 4/1991 | 426/77 |
| EP | 0 524 464 A1 | | 1/1993 | |
| EP | 555775 | * | 8/1993 | |
| EP | 0 631 948 | | 4/1995 | |
| EP | 0 710 462 A1 | | 5/1996 | |
| EP | 0 761 148 | | 3/1997 | |
| EP | 0 904 717 | | 3/1999 | |
| GB | 300869 | | 11/1928 | |
| GB | 400077 | | 10/1933 | |
| GB | 415929 | | 9/1934 | |
| GB | 1110513 | | 4/1968 | |
| JP | 64-25029 | | 10/1989 | |
| NL | 8403438 | | 6/1986 | |
| NL | 8901809 | | 2/1991 | |
| NL | 9400837 | * | 5/1994 | |
| WO | WO90/13487 | * | 11/1990 | 426/77 |
| WO | WO 94/02059 | | 2/1994 | |
| WO | WO 95/25457 | | 9/1995 | |

OTHER PUBLICATIONS

Exhibit I, Advertisement for Gino Rossi machines in "The Best of Made in Italy" special issue of 1993.
Exhibit J, Declaration of Giorgio Pergel of G. Rossi S.p.A. dated Jan. 9, 2003, concerning measurements of the coffee pads manufactured by the machines shown in Exhibit I allegedly since 1985.
Exhibit K, Advertisements for Ghigo, Grimac, and Monopack Machines in "Vending Magazines" dated 1995.
Exhibit L, Advertisements for Cappellini s.n.c., Gino Rossi, IMA, and Schoeller Hoesch in "Tea & Coffee Journal" dated 1995.
Exhibit M, Photographs of machine used to make coffee pads, undated.
Exhibit N, Declaration of Marla Rom and Eric Vool of Koffiebranderij Rom concerning the sale by Rom allegedly since 1988 of soft coffee pads with flat surface and rounded bottom manufactured using the machine of Exhibit M.
Exhibit O, Declaration of Michel Guerin dated Jan. 8, 2003, regarding the machine of Exhibit M.
Exhibit P, Advertisement for OMAG machine for the manufacture of coffee pads, undated.
Exhibit Q, Opposition papers filed at the European Patent Office against EP 0 904 717 B1, dated Mar. 24, 2003.
Exhibit R, Offer dated Nov. 29, 1993 by OPEM to Café Liegeois to supply a machine to manufacture coffee pads.
Exhibit A, Two (2) sheets of photographs, Letter from Merkur Kaffee AG dated Jan. 20, 2003 Espresso package of Merkur and Merkur pouch, 3 pages.
Exhibit B, Photograph marked E15-3, Letter from Kraft Foods dated Jan. 30, 2003, Carte Noir brochure, tariff list, Carte Noir pouch, and Carte Noir packages, 11 pages.
Exhibit C, Photograph marked E16-2, Letter from Verheyen dated Jan. 22, 2003, 4 invoices, SAS pouch. 6 pages.
Exhibit D, Declaration of Serge Binn with enclosures dated Feb. 20, 2004, 62 pages (with translation).
Exhibit E, Letter from Linklaters De Bandt dated Nov. 5, 2003 (with translation).
Exhibit F, Letter from Bird & Bird dated Nov. 10, 2003 (with translation).
Exhibit G, Letter from Linklaters De Bandt dated Nov. 27, 2003(with translation).
Exhibit H, Declaration of Viktor Josef Wiederkehr dated May 6, 2004, 9 pages.
Exhibit I, Krups Price List dated 1966, 5 pages.
Exhibit J, Krups Price List for Spare Parts dated 1966, 5 pages.
Exhibit K, Krups Price List dated 1974, 4 pages.
Exhibit L, Photos of a Carte Noir Espresso package and a sealed envelope with the label: European Patent EP0904717 Sample for Board dated Jul. 1996.
Exhibit M, Five (5) sheets of photographs, undated.
Exhibit N, Krups T8 Brochure, undated, 5 pages (English translation).
Exhibit A, Photographs of 14-pad package of Carte Noire with best-before date of Jul. 1996.
Exhibit B, Advertisement for Carte Noire coffee pads dated Mar. 31, 1995.
Exhibit C, Price list including listing for Carte Noire coffee pad dated Jan. 22, 1996.
Exhibit D, Photographs of Sas Coffee pads and packaging, undated.
Exhibit E, Declaration of Mark Verheyen dated Jan. 22, 2003 stating that Sas Coffee pads were allegedly commercialized on or before 1995.
Exhibit F, Photographs of 28-pad package of Merkur Espresso coffee pads, with best-before date of May 26, 2001.
Exhibit G, Letter from U. Perron dated Jan. 20, 2003, enclosing 28-pad packaging of Merkur Espressor coffee pads without pads or date with statement that the product was allegedly on the market since 1993.

* cited by examiner

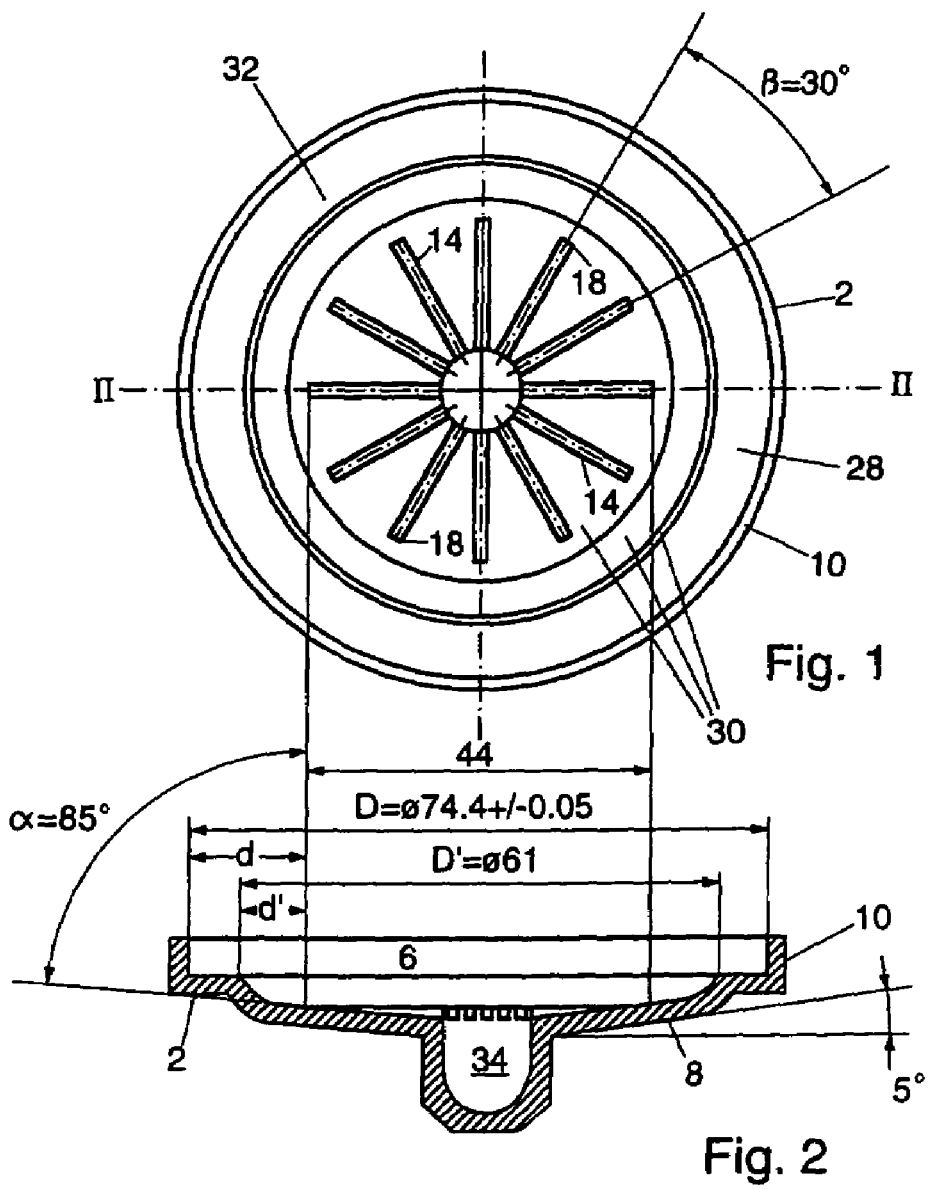
Fig. 1
Fig. 2
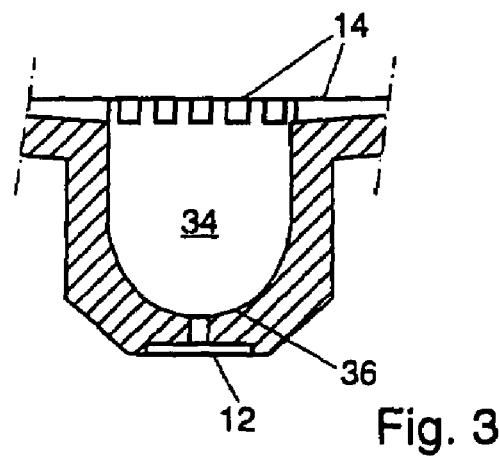
Fig. 3

ASSEMBLY FOR USE IN A COFFEE MACHINE FOR PREPARING COFFEE

This application is a divisional of application Ser. No. 09/955,798, filed Sep. 19, 2001 now abandoned, which is a continuation application of 09/479,630, filed Jan. 7, 2000 (now abandoned), which is a 09/164,141 filed Aug. 30, 1998 continuation from U.S. Pat. No. 6,021,705, issued Feb. 8, 2000. The application is incorporated herein by reference.

The invention relates to an assembly for use in a coffee machine for preparing coffee, comprising a container having a bowl-shaped inner space bounded by a bottom having at least one outlet opening and at least one vertical sidewall and, included in the inner space of the container, a pill-shaped pouch manufactured from filtering paper and filled with ground coffee, which pouch rests on the bottom and extends over the bottom to a position adjacent the vertical sidewall, while provided in the bottom are a number of channel-shaped grooves extending in radial direction of the bowl-shaped inner space to the outlet opening and, in use, hot water is fed under pressure to a top side of the container by means of the coffee machine, causing the hot water to be pressed from a top side of the pouch through the pouch for extracting the ground coffee included in the pouch, the coffee extract formed flowing from a bottom side of the pouch and from the container via the outlet.

Such assembly is known from U.S. Pat. No. 3,620,155. The inner space of the container thereof is of rectangular design. From each corner point of the inner space, a groove extends to the outlet opening provided in the center of the bottom. The pouch is likewise of rectangular design and has dimensions corresponding to the dimensions of the inner space of the container. Accordingly, a circumferential edge of the pouch is located adjacent the vertical sidewall of the container.

A problem of the known assembly is that in use, a portion of the hot water that is poured onto the pouch flows along the side edge of the pouch to the end of a groove located at a corner point of the container. This hot water then flows via the groove directly to the outlet opening. This involves a so-called bypass effect. As a consequence, not the complete amount of hot water that is fed at the top side of the container flows via the pouch to the outlet opening. Consequently, the coffee extract, which is for instance received in a container disposed under the outlet opening, is diluted with hot water. This will give the coffee extract an undesired strength. It is not possible to make allowance for the bypass effect during the preparation of coffee, because it is not known beforehand what amount of water will flow around the pouch and, via the grooves, to the outlet opening.

The object of the invention is to provide a solution to the problem posed, and accordingly, the invention is characterized in that each of said grooves extends from a position located at a distance from the sidewall in a direction away from the sidewall.

As the grooves do not extend to the sidewall, this has the surprising result that the bypass effect is substantially decreased. In accordance with a first further elaboration of the invention, it applies that the channel-shaped grooves extend in radial direction of the bowl-shaped inner space to the outlet opening, each of said grooves extending from the position located at a distance from the sidewall in the direction of the outlet opening. In particular, in this variant, the bypass effect proves to be negligibly small when it applies that the smallest distance between each of said grooves on one side and the vertical sidewall on the other is greater than 10% of a maximum diameter of the inner space of the container.

Preferably, it applies that the smallest distance between each of said grooves on one side and the vertical sidewall on the other is at least substantially equal to 20% of the maximum diameter of the inner space of the container.

The pouch extends to a position adjacent the vertical sidewall of the container. This means that it is essential to the invention that the dimensions of the pouch and the container be adjusted to each other. When the pouch is for instance of smaller design, the undesired bypass effect will occur in spite of the fact that said grooves extend from a position located at a distance from the sidewall in the direction of the outlet opening. Hence, the invention is incorporated in the specific properties of the container and the specific dimensions of the pouch which correspond therewith.

In particular, a bottom of the pouch has a shape substantially corresponding to the shape of the bottom of the container. In that case, the extraction will be optimal and the bypass effect minimal.

Preferably, the pouch comprises a disk-shaped top sheet and a disk-shaped bottom sheet which are interconnected adjacent their longitudinal edges, the interconnected parts of the top and bottom sheets forming an annular sealing seam.

The width of each of the grooves may vary from, for instance, 1 to 4 mm. In particular, the width approximately equals 2 mm. If the width of the grooves is chosen too great, this has as a consequence that a relatively large portion of the filtering area will be clear. This entails the risk of too little pressure being built up in the container and the flow of liquid through the filter becoming too great. This has a negative effect on the coffee-making efficiency.

When the assembly is used for preparing one or two cups of coffee, it applies that the diameter of the inner space of the container is preferably approximately equal to 74 mm and that the diameter of the pouch is also approximately equal to 74 mm. Likewise, it applies that the diameter of a coffee bed formed in the pouch is in that case approximately equal to 61 mm. If the dimensions of the pouch are chosen to be different, i.e. greater or smaller, there is again the risk of bypass. Moreover, it has been found that in that case the coffee-making efficiency is not optimal, either. In accordance with a second further elaboration of the invention, it applies that the bottom is provided with a number of vertical projections which are arranged at regular distances relative to each other, said projections being formed by the interspaces formed between the vertical projections.

It is observed that U.S. Pat. No. 5,287,797 also discloses a container in which a pouch can be included for preparing coffee. The container comprises a bottom having vertical ribs. This arrangement implies that between the ribs recesses are present whose lowest point is formed by the bottom of the container. However, these recesses are so wide that no bottom having grooves is involved here. Indeed, the surface area covered by the recesses is greater than the surface area covered by the ribs. In accordance with the invention, however, it applies that the area of the grooves is smaller than the area of those parts of the bottom where no grooves are provided. Hence, in the above US patent, no grooves according to the present invention are involved.

The invention will now be specified with reference to the accompanying drawings. In these drawings:

FIG. 1 is a top plan view of a first embodiment of a container according to the invention;

FIG. 2 is a cross section taken on the line II-II of FIG. 1;

FIG. 3 shows an enlarged part of FIG. 2;

Figure 5:
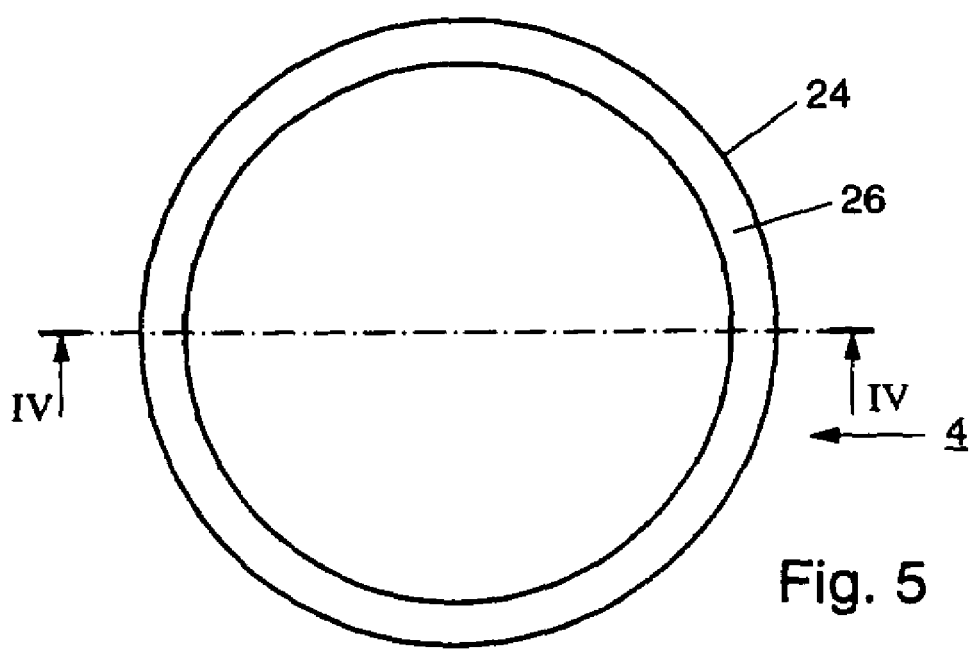
FIG. 5 is a top plan view of the pouch according to FIG. 4.

An assembly 1 according to the invention for use in a coffee machine for preparing coffee comprises a container 2 (see FIGS. 1-3 and FIG. 6) and a pouch 4 (see FIGS. 5-6) included in an inner space 6 of the container 2. The inner space 6 is of bowl-shaped design and is bounded by a bottom 8 and at least one vertical sidewall 10. Because in this example, the inner space 6 and the pouch 4 are of cylindrical design, this implies that the container 2 in fact only comprises a single vertical cylindrical sidewall 10 which is round and closed in itself.

Located in the bottom 8 is at least one and in this example only one outflow opening 12. Further provided in the bottom are a number of channel-shaped grooves 14 extending in radial direction of the inner space 6 to the outlet opening 12. The grooves each have a bottom 16 sloping down in the direction of the outlet opening 12. In this example, each bottom 16 of a groove 14 makes an angle $\alpha$ relative to the vertical which is equal to approximately 85°. It further applies that the grooves in this example each have a rectangular cross section. However, this is not necessarily the case. Other shapes are possible as well.

Each of the grooves 14 extends from a position 18 located at a distance from the sidewall 10 in the direction of the outlet opening 12. The total area occupied by the grooves is smaller than the total area of the bottom 8 that is not occupied by the grooves 14. In this example, the container is provided with 12 grooves, adjacent grooves enclosing an angle $\beta$ of about 30°.

Figure 4:
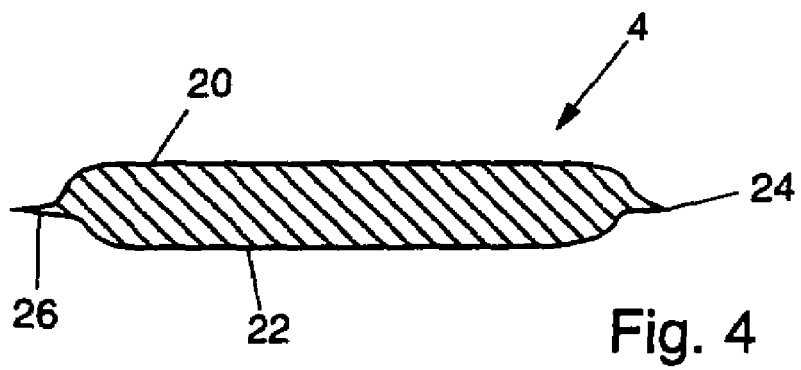
FIG. 4 is a cross section of a pouch taken on the line IV-IV of FIG. 5, associated with the container according to FIGS. 1-3.

The pouch 4 (see FIGS. 4 and 5) is pill-shaped and manufactured from filtering paper and filled with ground coffee. The pouch comprises a disk-shaped top sheet 20 manufactured from filtering paper and a disk-shaped bottom sheet 22 likewise manufactured from filtering paper. The disk-shaped bottom sheet and the disk-shaped top sheet are interconnected adjacent the longitudinal edges 24, the interconnected parts of the top and bottom sheets forming an annular sealing seam 26.

Figure 6:
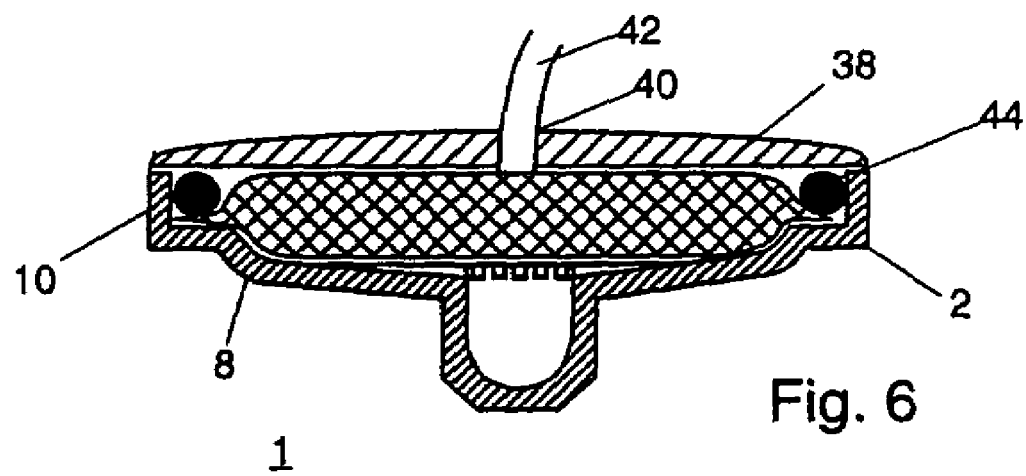
FIG. 6 is a cross section of an assembly according to the invention, consisting of the container of FIGS. 1-3 and the pouch of FIGS. 4 and 5.

When the pouch 4 is inserted into the container 2 (see FIG. 6), it extends over the bottom 8 of the container 2 to a position adjacent the vertical sidewall 10 of the container 2 (see also FIG. 6). In this example, it applies that the smallest distance d between each of said grooves 14 on one side and the vertical sidewall 10 on the other is greater than 10% of the maximum diameter D of the inner space of the container 2. In this example, it even applies that the smallest distance d between each of said grooves 14 on one side and the vertical sidewall 10 on the other is at least substantially equal to 20% of the maximum diameter D of the inner space of the container 2.

The bottom 8 comprises an outer horizontal annular bottom part 28 bounding the sidewall 10. The bottom 8 further comprises an inner saucer-shaped bottom part 30 bounding an inner edge 32 of the annular bottom part 28. Adjacent the annular bottom part 28, the saucer-shaped bottom part 30 slopes downwards in a direction away from the sidewall. In this example, the grooves extend exclusively in the saucer-shaped bottom part. More in particular, it applies in this example that each of said grooves extends from a position 18 located at a distance from the inner edge 32 of the annular bottom part 28 in the direction of the outlet opening 12. The container is preferably dimensioned such that the smallest distance d' between each of said channels 14 on one side and the inner edge 32 of the annular bottom part 28 on the other is greater than 10% of the maximum diameter D' of the saucer-shaped bottom part 30.

Provided in the center of the saucer-shaped bottom part 30 is a recess 34, with the outlet opening 12 being located in a bottom 36 of the recess 34. The pouch preferably has a bottom which in this example is formed by the bottom sheet 22 whose shape substantially corresponds to the shape of the bottom 8 of the container.

In use, the pouch 4 is inserted into the container 2, as shown in FIG. 6. The assembly 1 is then inserted into a coffee machine known per se. The coffee machine comprises a cover 38 closing off the assembly 1 as soon as it has been placed in the machine. The cover 38 comprises an opening 40 through which, via a hose 42, hot water can be fed to the inner space 6 of the container. Adjacent its circumferential edge, the cover further comprises a sealing ring 44 closed in itself.

The sealing seam 26 of the pouch 4 is located between the sealing ring 44 and the annular bottom part 28. When, in use, hot water is subsequently fed to the inner space 4 of the assembly via the hose 42, a pressure is created in the inner space 6. Due to this pressure, the sealing ring 44 moves outwards in radial direction to sealingly abut against the vertical sidewall 10. Next, the hot water will penetrate into the pouch 4 via the top sheet 20. In the pouch 4, the coffee extract is then formed. This coffee extract will subsequently leave the pouch again via the bottom sheet 22. In particular in places where the grooves 14 are present, the coffee extract can flow from the pouch. In positions between the grooves 14, little or no extract will in principle flow from the pouch. The effect thus achieved is that the hot water does not flow through the pouch too fast. This again results in that the coffee-making efficiency will be optimal.

The coffee extract ending up in the grooves 14 will subsequently flow to the recess 34 and leave the container 2 via the outlet opening 12. Under the container 2, a cup can for instance be placed which is filled with the coffee extract. As the channel-shaped grooves 14 slope downwards in the direction of the recess 34, a proper flow through the pouch is promoted. It is also guaranteed that no bypass occurs. This means that the hot water fed to the container does not flow to the outlet opening 12 without moving through the coffee bed included in the pouch. This is guaranteed in that in accordance with the invention, said grooves extend from a position 18 located at a distance from the sidewall in the direction of the outlet opening. Where no grooves are present, the bottom of the pouch 4 directly rests on the bottom of the container 8. Hence, at these positions, the hot water can hardly flow from the pouch, if at all. This implies that at first, no water can from to the outlet opening 12 from a top side of the pouch through the sealing seam of the pouch. If this actually happened, pure water, i.e. no coffee extract, would flow to the outlet opening 12, causing a bypass effect. The coffee extract received in a cup would then be diluted with hot water.

Because according to the present embodiment, it applies that the smallest distance d between each of the grooves on one side and the vertical sidewall on the other is greater than 10% of the maximum diameter D of the inner space of the container, it is guaranteed that the bypass effect will at least substantially not occur.

If the hot water flowed through the coffee bed at a position located adjacent the sealing seam 26, the effect occurring would be that the coffee-making efficiency is not optimal. After all, at this position, the height of the coffee bed is relatively low, so that the flow-through will be relatively fast. Moreover, the flow of liquid chooses the path of least resistance, so that a disproportionately large part of the hot water will flow through this portion of the coffee bed. As in accordance with the invention, it further applies that the smallest distance d' between each of the grooves on one side and the inner edge of the annular bottom part on the other is greater than 10% of the maximum diameter D' of the annular bottom part 28, it is provided that this effect does not occur and the coffee-making efficiency is in fact optimal. As it is, the channel-shaped grooves 14 do not extend to positions where the coffee bed of the pouch 4 is relatively thin. As the bottom of the pouch has a shape substantially corresponding to the shape of the bottom of the container, said dimensions of the grooves 14 can be optimally utilized. Because it applies in particular that the dimensions of the bottom disk-shaped sheet 22 from a center of the sheet to the annular sealing seam correspond to the dimensions of the saucer-shaped bottom part 30, it applies that said optimum extraction efficiency is achieved. It also applies that the annular sealing seam has dimensions substantially corresponding to the dimensions of the annular bottom part. This also implies that a pouch inserted into the container is optimally and unequivocally positioned in the container. The pouch as it were automatically searches the position in which it is supposed to be located.

In this example, the assembly is intended for preparing one cup of coffee. For that reason, the diameter of the inner space of the container is approximately equal to 74 mm. To effect that the bypass effect does not occur, it applies that the diameter of the pouch is also approximately equal to 74 mm. Of course, the other above-discussed conditions should be met as well in order to minimize the bypass effect. It further applies that the diameter of a coffee bed formed in the pouch is approximately equal to 61 mm. This diameter corresponds to the diameter of the annular bottom part 28. This diameter, too, is particularly suitable for preparing one cup of coffee. Since the two diameters are chosen to be equal, it moreover applies that when the above conditions are also met, the bypass effect is minimized, while the coffee-making efficiency is maximized.

Figure 7:
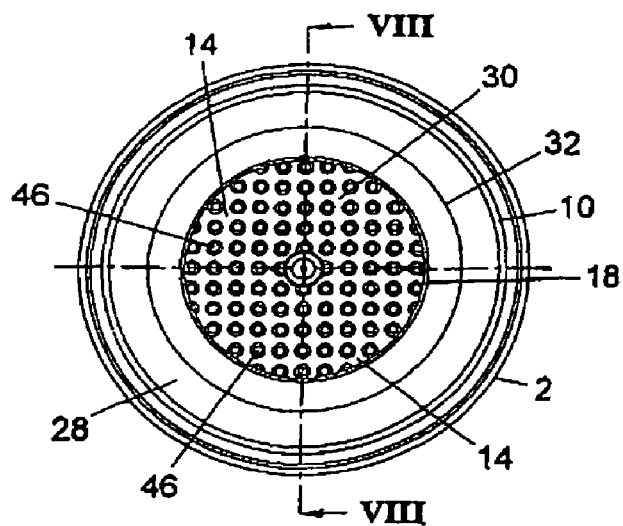
FIG. 7 is a top plan view of a second embodiment of a container according to the invention.
Figure 8:
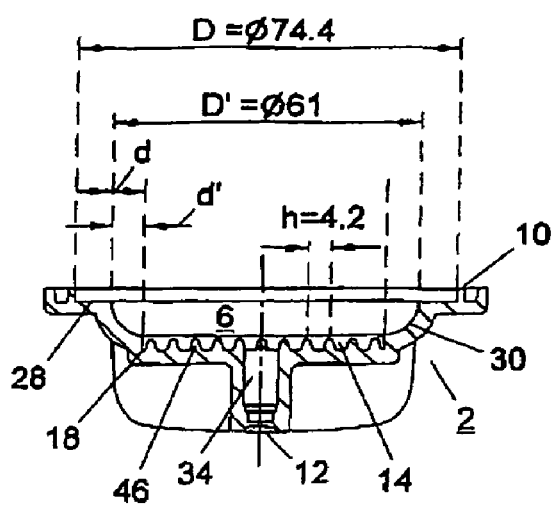
FIG. 8 is a cross section of the container according to FIG. 7.
Figure 9:
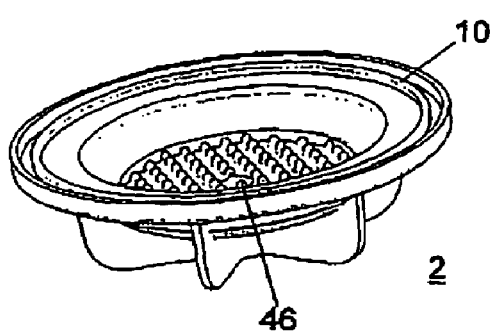
FIG. 9 is a side elevation of the container according to FIG. 7.
Figure 10:
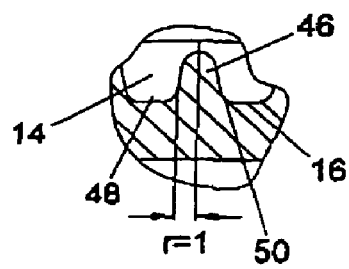
FIG. 10 shows a projection of the container according to FIG. 7.

The invention is by no means limited to the embodiment of the container outlined hereinabove. FIGS. 7-9 show an alternative embodiment of the container. Parts corresponding to those of the container which is discussed with reference to FIGS. 1-6 are provided with identical reference numerals.

The container entirely corresponds to the container discussed with reference to FIGS. 1-6, the difference being that the grooves 14 are shaped differently. In this example, however, it applies that the bottom is provided with a number of vertical projections arranged at regular distances relative to each other. The grooves 14 are formed by the interspaces formed between the vertical projections 46. In this example, the vertical projections 46 are substantially of cylindrical design. As is clearly visible in FIG. 7, the projections are arranged in rows and columns relative to each other. As a result, the channel-shaped grooves formed between the projections are in parallel and perpendicular arrangement relative to each other.

It further applies that at the bottom side 50 of the projections, the interspaces 49 formed between the projections cover 75-94% of the total surface area of the bottom that is provided with projections. Hence, this involves a total area of the saucer-shaped bottom part 30, less the portion of the saucer-shaped bottom part which, adjacent the annular bottom part 28, slopes downwards in a direction away from the sidewall.

It further applies that in this example, the projections have their top sides provided with a round tip. The operation of the container according to FIGS. 7-10 is completely analogous with that of the container according to FIGS. 1-6. In the container of FIGS. 7-9, the pouch of FIG. 4 can be placed. Also, the cover 38 can be used for closing off the container, the sealing ring 44 again being located within the vertical sidewall 10 of the container of FIGS. 7-10.

In accordance with another variant of the invention, the container may be provided with a larger number of projections 46 than shown in FIGS. 7-10. In that case, however, the projections may have a much smaller cross section.

In the embodiment outlined with reference to FIGS. 7-10, it applies that the center-to-center distance of the projections is 3-5 mm, in particular about 4.2 mm. The radius R adjacent the bottom side of the projections may vary from, for instance, 0.5 to 2 mm and is in this example about 1 mm. Such variants are each understood to fall within the framework of the invention.

As discussed hereinabove, the invention relates to a container on one side and a pouch on the other, optimally adjusted to each other. Hence, the invention is embodied both in the container and in the pouch. As the container has a diameter of 74 mm, the pouch will have to have an at least substantially equal diameter. Accordingly, such pouch is understood to fall within the framework of the invention.

The invention claimed is:

1. An assembly for use in a coffee machine for preparing coffee, comprising a container having a bowl-shaped inner space bounded by a bottom having at least one outlet opening, said opening being smaller than the inner space and at least one vertical sidewall and, included in the inner space of the container, a separate and replaceable pill-shaped sealed pouch manufactured from filtering paper and filled with ground coffee forming a coffee bed in the pouch, the pouch comprising a disk-shaped top sheet and a disk-shaped bottom sheet which are interconnected adjacent their longitudinal edges, the interconnected parts of the top and bottom sheets forming an annular sealing seam wherein the pouch rests on the bottom and extends over the bottom, while provided in the bottom are a number of channel-shaped grooves extending in radial direction of the bowl-shaped inner space to the outlet opening and, in use, configured to allow hot water to be fed under pressure to a top side of the container by means of the coffee machine, causing the hot water to be pressed from a top side of the pouch through the pouch for extracting the ground coffee included in the pouch, the coffee extract formed flowing from a bottom side of the pouch and from the container via the outlet the bottom comprises an outer horizontally directed annular bottom part bounding the side wall and an inner saucer-shaped bottom part bounding an inner edge of the annular bottom part and wherein the grooves extend exclusively in the saucer-shaped bottom part and from a position located at a distance from the inner edge of the annular bottom part toward the outlet opening, and wherein each of said grooves extends from a position located under the coffee bed of the pouch in a direction away from the side wall.

2. An assembly according to claim 1, wherein the channel-shaped grooves extend in radial direction of the bowl-shaped inner space to the outlet opening, each of said grooves extending from the position located under the coffee bed of the pouch in the direction of the outlet opening.

3. An assembly according to claim 2, wherein the smallest distance between each of said grooves on one side and the vertical sidewall on the other is greater than 10% of a maximum diameter of the inner space of the container.

4. An assembly according to claim 3, wherein the smallest distance between each of said grooves on one side and the vertical sidewall on the other is at least substantially equal to 20% of the maximum diameter of the inner space of the container.

5. An assembly according to claim 1, wherein the bottom is provided with a number of vertical projections arranged at regular distances relative to each other, said grooves being formed by the interspaces formed between the vertical projections.

6. An assembly according to claim 5, wherein the vertical projections are substantially cylindrical.

7. An assembly according to claim 5, wherein the projections are arranged in rows and columns relative to each other.

8. An assembly according to claim 5, wherein at the bottom side of the projections, the interspaces formed between the projections cover 75-94% of the total area of the bottom that is provided with projections.

9. An assembly according to claim 5, wherein the projections have their top sides provided with round tips.

10. An assembly according to claim 1, wherein the saucer-shaped bottom part adjacent the annular bottom part slopes downwards in a direction away from the sidewall.

11. An assembly according to claim 10, wherein each of the grooves extends from a position located at a distance from the inner edge of the annular bottom part in the direction of the outlet opening.

12. An assembly according to claim 11, wherein the smallest distance between each of said grooves on one side and the inner edge of the annular bottom part on the other is greater than 10% of a maximum diameter of the annular bottom part.

13. An assembly according claim 2, wherein the grooves have a rectangular cross section.

14. An assembly according to claims 10, whereby in the center of the saucer-shaped bottom part, a recess is provided, the outlet opening being located in a bottom of the recess.

15. An assembly according to claim 1, wherein the bottom of the pouch has a shape substantially corresponding to the shape of the bottom of the container.

16. An assembly according to claim 10, wherein dimensions of the bottom disk-shaped sheet from a center of the sheet to an annular sealing seam correspond to dimensions of the saucer-shaped bottom part.

17. An assembly according to claim 16, wherein the annular sealing seam has dimensions substantially corresponding to the dimensions of the annular bottom part.

18. An assembly according to claim 1, wherein the diameter of the inner space of the container is approximately equal to 74 mm and that the diameter of the pouch is approximately equal to 74 mm.

19. An assembly according to claim 1, wherein the diameter of the inner space of the container is approximately equal to 74 mm and that the diameter of a coffee bed formed in the pouch is approximately equal to 61 mm.

20. An assembly according to claim 1, wherein the bottom is provided with a number of vertical projections arranged at regular distances relative to each other, said grooves being formed by the interspaces formed between the vertical projections.

21. An assembly according to claim 1, wherein saucer-shaped bottom part adjacent the annular bottom part slopes downwards in a direction away from the sidewall.

22. An assembly according to claim 1, wherein the bottom of the pouch has a shape substantially corresponding to the shape of the bottom of the container.

23. An assembly according to claim 1, wherein the diameter of the inner space of the container is approximately equal to 74 mm and that the diameter of the pouch is approximately equal to 74 mm.

24. An assembly according to claim 1, wherein the diameter of the inner space of the container is approximately equal to 74 mm and that the diameter of a coffee bed formed in the pouch is approximately equal to 61 mm.

25. An assembly according to claim 1, wherein the inner space of the container is cylindrical, an axial axis of the inner space being at least substantially vertically directed.

* * * * *